(12) United States Patent
Watt et al.

(10) Patent No.: US 10,988,193 B2
(45) Date of Patent: Apr. 27, 2021

(54) DISCONNECTABLE WORK IMPLEMENT DRIVE SYSTEM

(71) Applicant: Deere & Company, Moline, IL (US)

(72) Inventors: Dwayne B. Watt, Bartlesville, OK (US); Randall L. Long, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 447 days.

(21) Appl. No.: 16/112,344

(22) Filed: Aug. 24, 2018

(65) Prior Publication Data
US 2019/0256097 A1 Aug. 22, 2019

Related U.S. Application Data (60) Provisional application No. 62/710,351, filed on Feb. 16, 2018.

(51) Int. Cl.
*B62D 59/04* (2006.01)
*B62D 59/02* (2006.01)
(Continued)

(52) U.S. Cl.
CPC ........... *B62D 59/04* (2013.01); *B62D 53/045* (2013.01); *B62D 59/02* (2013.01); *F16D 11/14* (2013.01);
(Continued)

(58) Field of Classification Search
CPC .. B60Y 2200/221; B62D 59/02; B62D 59/04; F16D 11/14; F16D 25/14; F16D 25/061;
(Continued)

(56) References Cited

U.S. PATENT DOCUMENTS 4,027,738 A  6/1977 Lundin
4,140,194 A * 2/1979 Moreau ................. B60K 17/10
                                            180/14.3
(Continued)

FOREIGN PATENT DOCUMENTS

CN     2858362 Y     1/2007
DE  102015122801 A1  2/2017
(Continued)

OTHER PUBLICATIONS

German Search Report issued in counterpart application No. 102019200490.3 dated Nov. 14, 2019. (122 pages).

*Primary Examiner* — Erin D Bishop
(74) *Attorney, Agent, or Firm* — Klintworth & Rozenblat IP LLP (57) ABSTRACT

An implement drive system is provided for an implement towed by a prime mover vehicle in a work vehicle train. The system includes an axle arrangement and an auxiliary power unit. The auxiliary power unit includes an electric motor; a planetary gear set receiving rotational input from the electric motor and providing a rotational output with a decreased rotational speed and an increased torque relative to the rotational input; and a disconnect device having an output configured to be coupled to the axle arrangement. The disconnect device is movable to a first position in which the disconnect device transfers the rotational output from the planetary gear set to the axle arrangement such the rotational input drives the wheels of the implement. The disconnect device is movable to a second position in which the disconnect device decouples the axle arrangement from the rotational input of the electric motor.

20 Claims, 10 Drawing Sheets (51) Int. Cl.
  *B62D 53/04* (2006.01)
  *F16D 11/14* (2006.01)
  *F16D 48/02* (2006.01)
  *F16D 25/061* (2006.01)
  *F16D 48/06* (2006.01)

(52) U.S. Cl.
  CPC ........... *F16D 25/061* (2013.01); *F16D 25/14* (2013.01); *F16D 48/06* (2013.01); *B60Y 2200/22* (2013.01); *B60Y 2200/221* (2013.01); *F16D 2500/10462* (2013.01); *F16D 2500/111* (2013.01); *F16D 2500/30415* (2013.01); *F16D 2500/30426* (2013.01); *F16D 2500/70406* (2013.01)

(58) Field of Classification Search
  CPC ........... F16D 48/06; F16D 2500/10462; F16D 2500/111; F16D 2500/30415; F16D 2500/30426; F16D 2500/70406
  See application file for complete search history.

(56) References Cited

U.S. PATENT DOCUMENTS

| | | |
|---|---|---|
| 8,544,574 B2 | 10/2013 | Fegley et al. |
| 8,627,908 B2 | 1/2014 | Wellborn et al. |
| 9,037,346 B2 | 5/2015 | Keys, II et al. |
| 9,334,940 B2 | 5/2016 | Neumann |
| 9,551,418 B1 | 1/2017 | Duppong et al. |
| 2013/0022430 A1 | 1/2013 | Anderson et al. |
| 2013/0076497 A1 | 3/2013 | Sheidler et al. |
| 2013/0079979 A1 | 3/2013 | Sheidler et al. |
| 2013/0079980 A1 | 3/2013 | Vuk et al. |

FOREIGN PATENT DOCUMENTS

| | | | |
|---|---|---|---|
| DE | 102017104747 A1 | 9/2017 | |
| DE | 102017125673 A1 | 5/2019 | |
| GB | 1417944 A | * 12/1975 | ........... B60K 17/356 |
| GB | 1526979 A | 10/1978 | |
| WO | 2003000538 A1 | 1/2003 | |

* cited by examiner

FIG. 11

DISCONNECTABLE WORK IMPLEMENT DRIVE SYSTEM

CROSS-REFERENCE TO RELATED APPLICATION(S)

This application claims the benefit of U.S. Provisional Application No. 62/710,351, filed Feb. 16, 2018, the entire disclosure of which is hereby incorporated by reference.

STATEMENT OF FEDERALLY SPONSORED RESEARCH OR DEVELOPMENT

Not applicable.

FIELD OF THE DISCLOSURE

This disclosure generally relates to arrangements with work vehicles and towed implements, and more specifically to implement drive systems providing tractive power to the axles of the towed implements.

BACKGROUND OF THE DISCLOSURE

Work (and other) vehicle trains may include onboard power sources to provide motive and other power during vehicle operation, including the towing of a trailing implement. During some instances, the work vehicle may be required to tow the implement over challenging terrain or under heavy loads that may cause issues for the work vehicle train.

SUMMARY OF THE DISCLOSURE

The disclosure provides implement drive systems with auxiliary power units for implements being towed by work vehicles.

In an aspect, the disclosure provides an implement drive system for an implement configured to be towed by a prime mover vehicle in a work vehicle train. The system includes an axle arrangement configured to support wheels of the implement; and an auxiliary power unit. The auxiliary power unit includes an electric motor; a planetary gear set receiving rotational input from the electric motor and providing a rotational output with a decreased rotational speed and an increased torque relative to the rotational input from the electric motor; and a disconnect device having an output configured to be coupled to the axle arrangement. The disconnect device is movable to a first position in which the disconnect device transfers the rotational output from the planetary gear set to the axle arrangement such the rotational input from the electric motor drives the wheels of the implement. The disconnect device is movable to a second position in which the disconnect device decouples the axle arrangement from the rotational input of the electric motor.

In another aspect, the disclosure provides a work vehicle train including a prime mover vehicle having a propulsion drive assembly configured to provide propulsion for the prime mover vehicle. The work vehicle train further includes a power system including a battery configured to provide electric power and a fluid power source configured to provide fluid power; and an implement configured to be towed by the prime mover vehicle. The implement includes a chassis coupled to the prime mover vehicle; an axle assembly coupled to the chassis and configured to support wheels of the implement; and an auxiliary power unit comprising: an electric motor configured to receive the electric power from the battery; a planetary gear set receiving rotational input form the electric motor and providing a rotational output with a decreased rotational speed and an increased torque relative to the rotational input from the electric motor; and a disconnect device having an output configured to be coupled to the axle arrangement and coupled to selectively receive the fluid power from the power system. The disconnect device is movable, upon receiving the fluid power, to a first position in which the disconnect device transfers the rotational output from the planetary gear set to the axle arrangement such that the rotational input from the electric motor drives the wheels of the implement. The disconnect device is movable to a second position in which the disconnect device decouples the axle arrangement from the rotational input of the electric motor.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed work vehicle train in which a towed implement includes a disconnectable implement drive system with an auxiliary power unit allowing the towed implement to alternatively freewheel or operate under power, as shown in the accompanying figures of the drawings described briefly above. Various modifications to the example embodiments may be contemplated by one of skill in the art.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C). Furthermore, in detailing the disclosure, terms of direction and orientation, such as "forward," "aft," "lateral," "horizontal," and "vertical" may be used. Such terms are defined, at least in part, with respect to the direction in which the work vehicle travels during use. Further, the discussion below may reference a cylindrical coordinate system with "axial," "radial," and "circumferential" orientations relative to a longitudinal axis.

For various reasons, it may be desirable for a work vehicle to pull or tow an associated implement as a vehicle train. At times, it may be necessary for the work vehicle train to traverse challenging terrain with the implement, such as muddy or hilly terrain, or to operate under heavy loads. In such situations, it is beneficial for the implement to operate in a powered mode. This disclosure provides an auxiliary power unit that may be selectively coupled to the implement to drive the wheels of the towed implement under power, thereby assisting the prime mover vehicle in towing the implement. However, when the work vehicle is towing the implement on the road or on flat ground, or under light loads, this assistance may not be necessary. In such situations, the auxiliary power unit may be selectively disconnected, such as remotely (e.g., electrically or hydraulically) from the cab of the prime mover vehicle, from the implement so that it may operate in a freewheel mode in which the auxiliary power unit is disengaged from the implement wheel train. When the auxiliary power unit is operatively disconnected from the axle assembly, the prime mover vehicle may pull the implement without assistance from the auxiliary power unit, and in certain embodiments without operative components of the auxiliary power unit being physically coupled to the wheels or moving. In certain embodiments, one or more of the auxiliary power units may be connected to one or more axle assemblies of the implement, either by a drive shaft or direct coupling of an output of the auxiliary power unit to an input to the axle assembly.

Figure 1A:
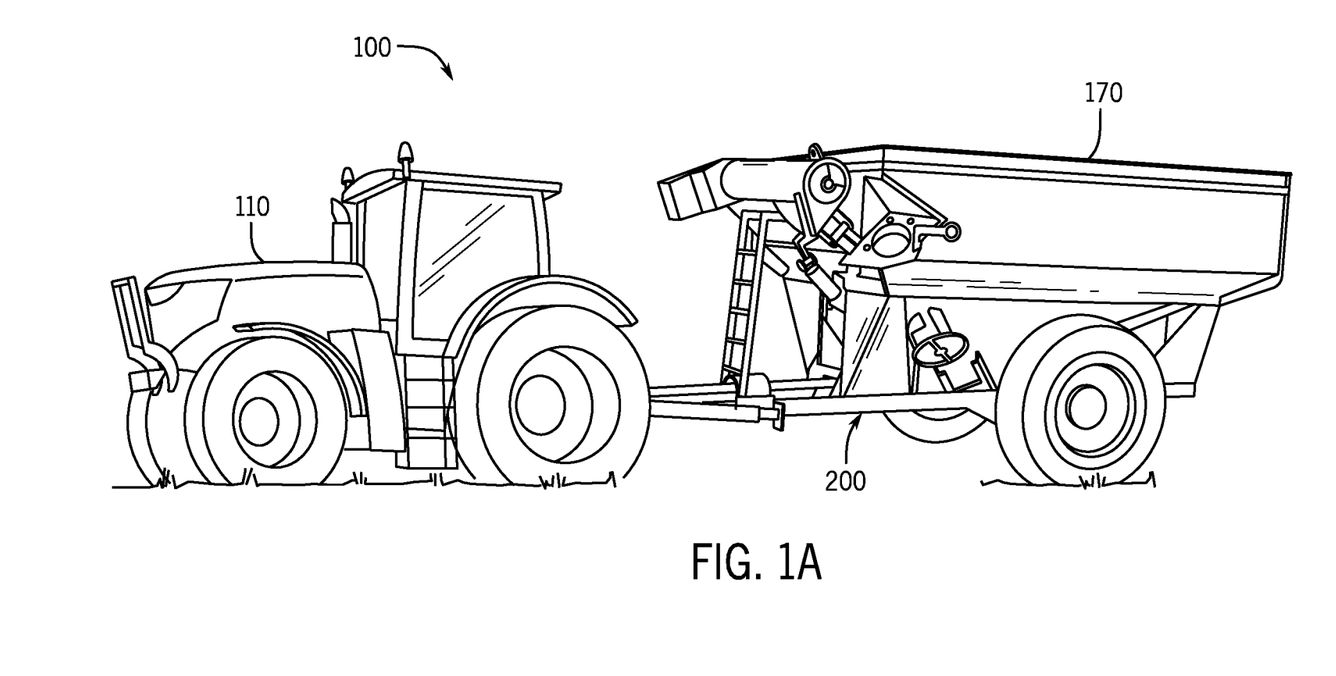
FIG. 1A is a side view of an example work vehicle train, with a prime mover vehicle in the form of an agricultural tractor and a towed implement in the form of a grain cart, that may be used in accordance with this disclosure.

Referring to FIG. 1A, the disclosed embodiments may be used in a work vehicle train 100 in which a prime mover work vehicle 110, shown as an agricultural tractor, utilizes an implement 170, such as a grain cart, in a towing configuration. Generally, the examples described herein are applicable to any type of work vehicle 110 and/or implement 170 train. The term "implement" may also be referred to as an accessory component, towed vehicle, or trailing vehicle. Examples of work vehicles 110 include tractors, trucks, loaders, and the like. Examples of implements 170 include a grain cart, as shown, as well as mowers, seeders, winches, pumps, blowers, booms, and the like.

Figure 1B:
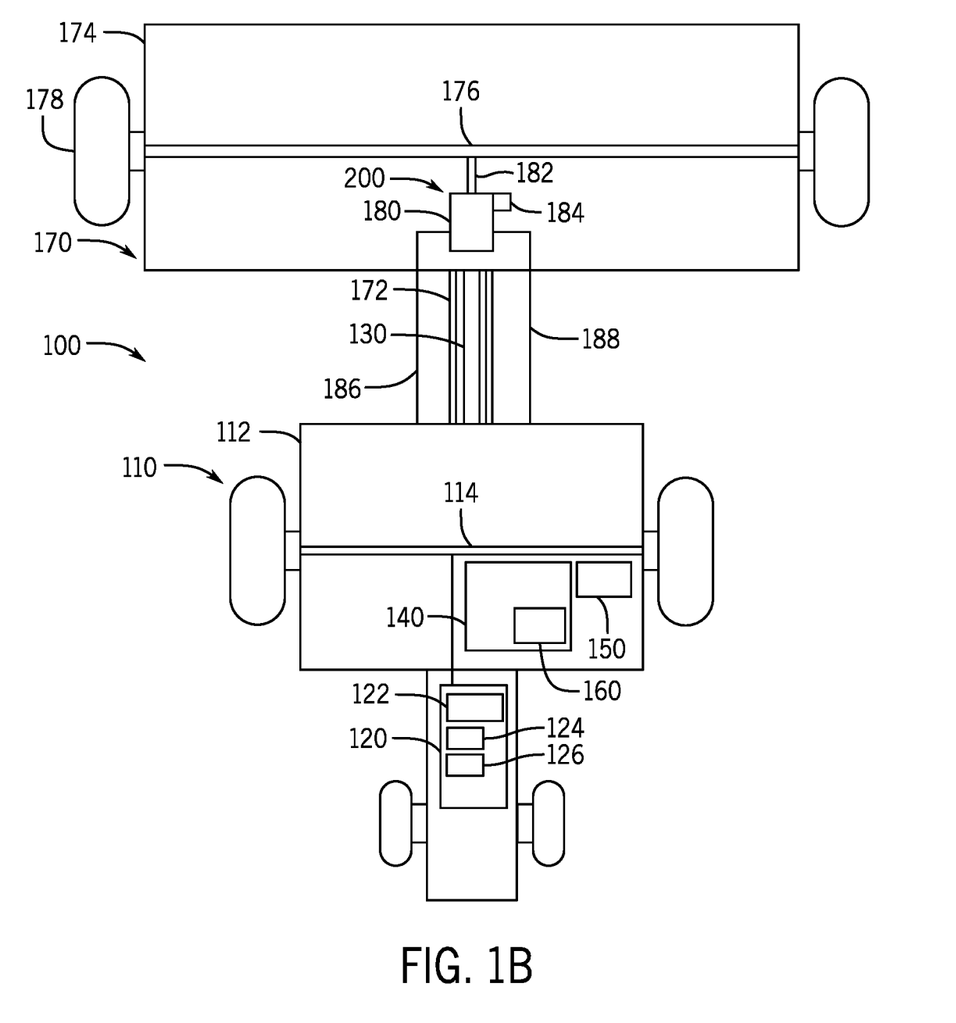
FIG. 1B is a schematic block diagram of the work vehicle train shown in FIG. 1A in accordance with an example embodiment.

FIG. 1A is one example of an arrangement 100 of work vehicle 110 and implement 170 that may utilize an implement drive system 200. FIG. 1B is a schematic block diagram of the arrangement 100 to introduce the components described in greater detail below.

Referring to FIG. 1B, the work vehicle 110 may be considered to include a main frame or chassis 112, a propulsion drive assembly 114, a power system 120, a power take-off (PTO) arrangement 130, and an operator platform or cabin 140. In this example, the work vehicle 110 further includes a controller 150 and an operator interface 160.

As is typical, the cabin 140 is mounted to the chassis 112 and houses the operator that controls operation of the work vehicle 110 via the controller 150 and operator interface 160. The power system 120 includes one or more power sources (e.g., an internal combustion engine, a fuel cell, an electric motor, and/or a hybrid-gas electric motor) used for propulsion of the work vehicle 110 via the propulsion drive assembly 114. In the depicted example, the power system 120 includes an engine 122 that may be utilized for propulsion. The power system 120 may also be considered to include other sources of power, such as a battery 124 and/or a fluid power source 126. Generally, the battery 124 provides electric power to various aspects of the work vehicle arrangement 100, and the fluid power source 126 provides hydraulic or pneumatic power to one or more systems on the work vehicle arrangement 100. In some examples, a generator may be provided to generate electric power.

In one example, the PTO arrangement 130 is provided to transfer power between the power system 120 and the implement 170. In one example, the PTO arrangement 130 includes a housing with a transmission, an input shaft and an output shaft. The input shaft is rotationally coupled to the power system 120 and is further directly or indirectly drivingly connected to the output shaft within the housing by a gear set of the transmission such that the power from the input shaft may be transferred to the output shaft. The implement 170 is drivingly connected to the output shaft via a PTO shaft to receive and utilize this power, e.g., to perform a dedicated function, such as distributing grains or seeds. In some examples, the PTO arrangement 130 may be omitted.

The controller 150 may be considered a vehicle controller for controlling or facilitating control of the vehicle 110 or a portion thereof, including the implement functions described below. As such, the controller 150 includes one or more control elements to control various aspects of the operation and is configured to implement the functions described herein. The controller 150 may be configured as a computing device with associated processor devices and memory architectures, as a hard-wired computing circuit (or circuits), as a programmable circuit, as a hydraulic, electrical or electro-hydraulic controller, or otherwise. As such, the controller 150 may be configured to execute various computational and control functionality. In some embodiments, the controller 150 may be configured to receive input signals in various formats (e.g., as hydraulic signals, voltage signals, current signals, and so on), and to output command signals in various formats (e.g., as hydraulic signals, voltage signals, current signals, mechanical movements, and so on). The controller 150 may communicate with other systems or devices (including other controllers) in various known ways, including via a bus, via wireless or hydraulic communication means, or otherwise. An example location for the controller 150 is depicted in FIG. 1B. It will be understood, however, that other locations are possible including other locations on the work vehicle 110, or various remote locations.

In some embodiments, the controller 150 may be configured to receive input commands and to interface with the operator via the operator interface (or human-machine interface) 160, which may be disposed inside the cabin 140 of the work vehicle 110 for convenient access by the operator. The operator interface 160 may be an input device and an output device and configured in a variety of ways. In some embodiments, the operator interface 160 may include one or more joysticks, various switches or levers, one or more buttons, a touchscreen interface that may be overlaid on a display, a keyboard, a speaker, a microphone associated with a speech recognition system, or various other human-machine interface devices. Among other functions, the operator interface 160 may be used to receive operator commands for activating and controlling the implement 170, including selection between the modes described below.

The implement 170 is mechanically coupled to the work vehicle 110 via a tow connection 172 mounted to an implement chassis or frame 174. An implement drive system 200 may be mounted on the frame 174. Generally, the implement drive system 200 may be considered to include an axle assembly 176 and auxiliary power unit 180, and optionally, an axle coupling element 182. The axle assembly 176 extends between wheels 178 provided on each side of the implement frame 174. The auxiliary power unit 180 is coupled to the axle assembly 176 with the axle coupling element 182. The auxiliary power unit 180 may include, or otherwise be associated with, a control unit 184 and be coupled to the power system 120 to receive one or more forms of power from the work vehicle 110. For example, an electric power line 186 may provide electric power from the battery 124, and a fluid power line 188 may provide fluid power (e.g., pressurized air or fluid) from the fluid power source 126. In other examples, the implement 170 may have other arrangements, and/or one or more of the components above may be omitted and/or other components provided. For example, the implement 170 may be provided with a battery and/or fluid source, and one or both lines 186, 188 may be omitted.

The control unit 184 generally implements operation of the auxiliary power unit 180. For example, the control unit 184 may receive signals representing operator input via the operator interface 160 and implement the appropriate functions and modes discussed in greater detail below. As also discussed below, the control unit 184 may monitor and control various operational characteristics of auxiliary power unit 180. Similar to controller 150, control unit 184 be configured as a computing device with associated processor devices and memory architectures, as a hard-wired computing circuit (or circuits), as a programmable circuit, as a hydraulic, electrical or electro-hydraulic controller, or otherwise to execute various computational and control functionality.

As such, during operation of the work vehicle 110 and/or implement 170, the operator selects the appropriate implement mode via the operator interface 160. As described in greater detail below, such modes include a power (or assist or tractive) mode and a freewheel mode. In the power mode, the auxiliary power unit 180 generates mechanical power and is coupled to the axle assembly 176 to drive the wheels 178 of the implement 170, thereby providing tractive assistance for the work vehicle 110 towing the implement 170. The power mode may be particularly beneficial in uneven, muddy, loose, or hilly terrain. In the freewheel mode, the auxiliary power unit 180 is decoupled or disconnected from the axle assembly 176 such that the auxiliary power unit 180 is not providing power to the wheels 178, thereby allowing the work vehicle 110 to pull the implement 170 without assistance. The freewheel mode may be particularly beneficial when the work vehicle 110 is towing the implement 170 on a road and/or at high speeds.

Accordingly, upon operator selection, the operator interface 160 communicates with the controller 150 and/or the control unit 184 to implement the selection. As examples, the controller 150 and/or the control unit 184 generates appropriate commands to one or more components of the auxiliary power unit 180, including a disconnect device, an electric motor, and/or power inputs such as fluid power and/or electric power, to implement the mode. In some situations, mode selection may be made automatically by the controller 150 and/or the control unit 184 based on operating conditions. Additional details about the implement drive system 200 are provided below.

Figure 2:
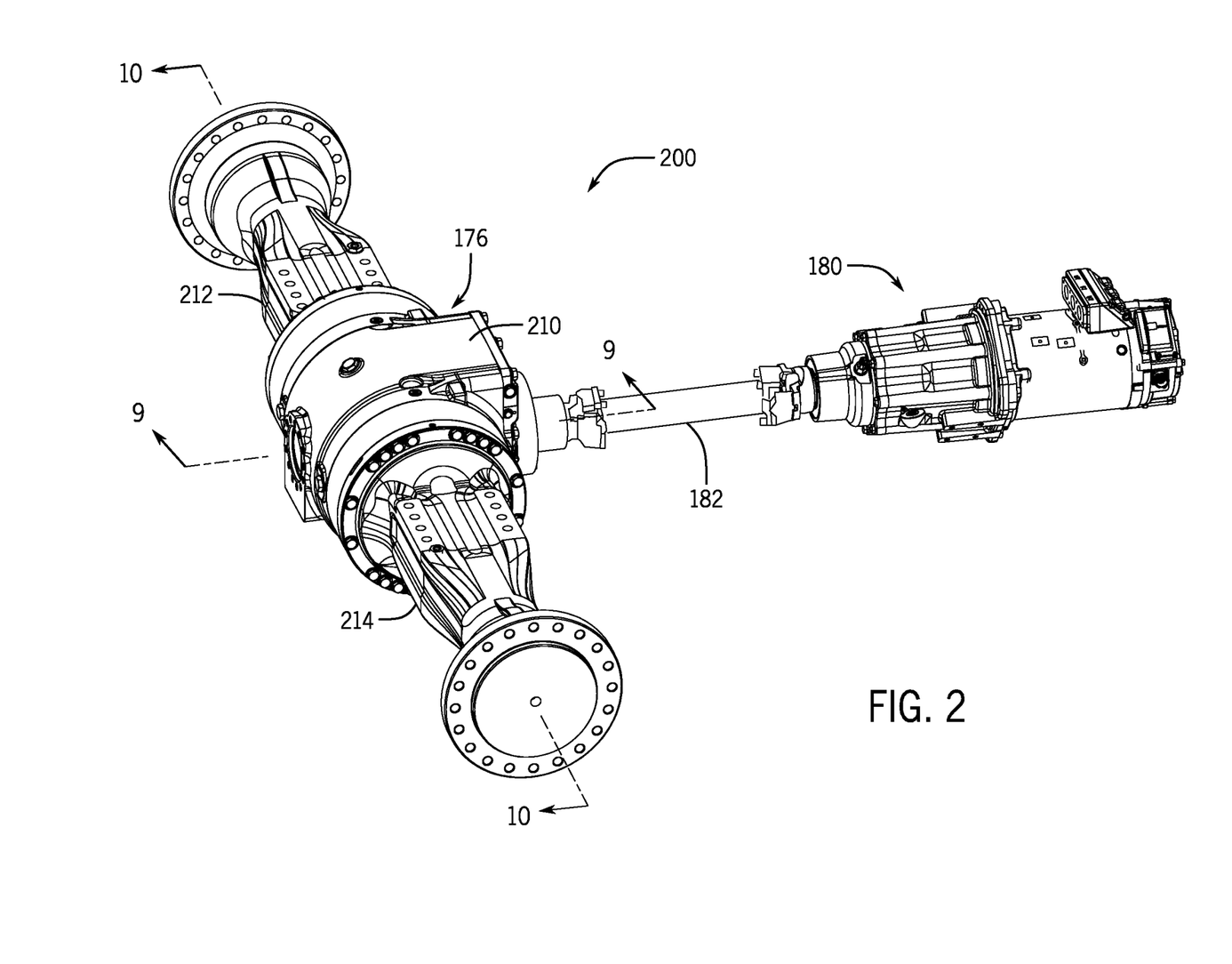
FIG. 2 is an implement drive system that may be incorporated into the work vehicle train shown in FIGS. 1A and 1B in accordance with an example embodiment.

FIG. 2 is a perspective view of the implement drive system 200 with portions of the axle assembly 176, the axle coupling element 182, and the auxiliary power unit 180 removed from the implement 170. The axle coupling element 182 may take any suitable form, including a shaft and/or yoke. In this example, the axle assembly 176 includes a differential 210 that receives the axle coupling element 182. The differential 210 engages a first (or left) axle component or stub shaft 212 and a second (or right) axle component or stub shaft 214. Although not shown in FIG. 2, the first and second axle components 212, 214 support the wheels 178 (FIG. 1) on which the implement 170 travels. As a result of this arrangement, torque may be transferred between the auxiliary power unit 180, the axle assembly 176, and the wheels 178. As noted above, during the power mode, the auxiliary power unit 180 may be used to drive the axle assembly 176, and thus, the wheels 178 (FIG. 1) of the implement 170. During the freewheel mode, the differential 210 may rotate with the axle assembly 176 as the implement 170 is towed, although most of the components of the auxiliary power unit 180 are disconnected from such rotation, as discussed in greater detail below.

Figure 3:
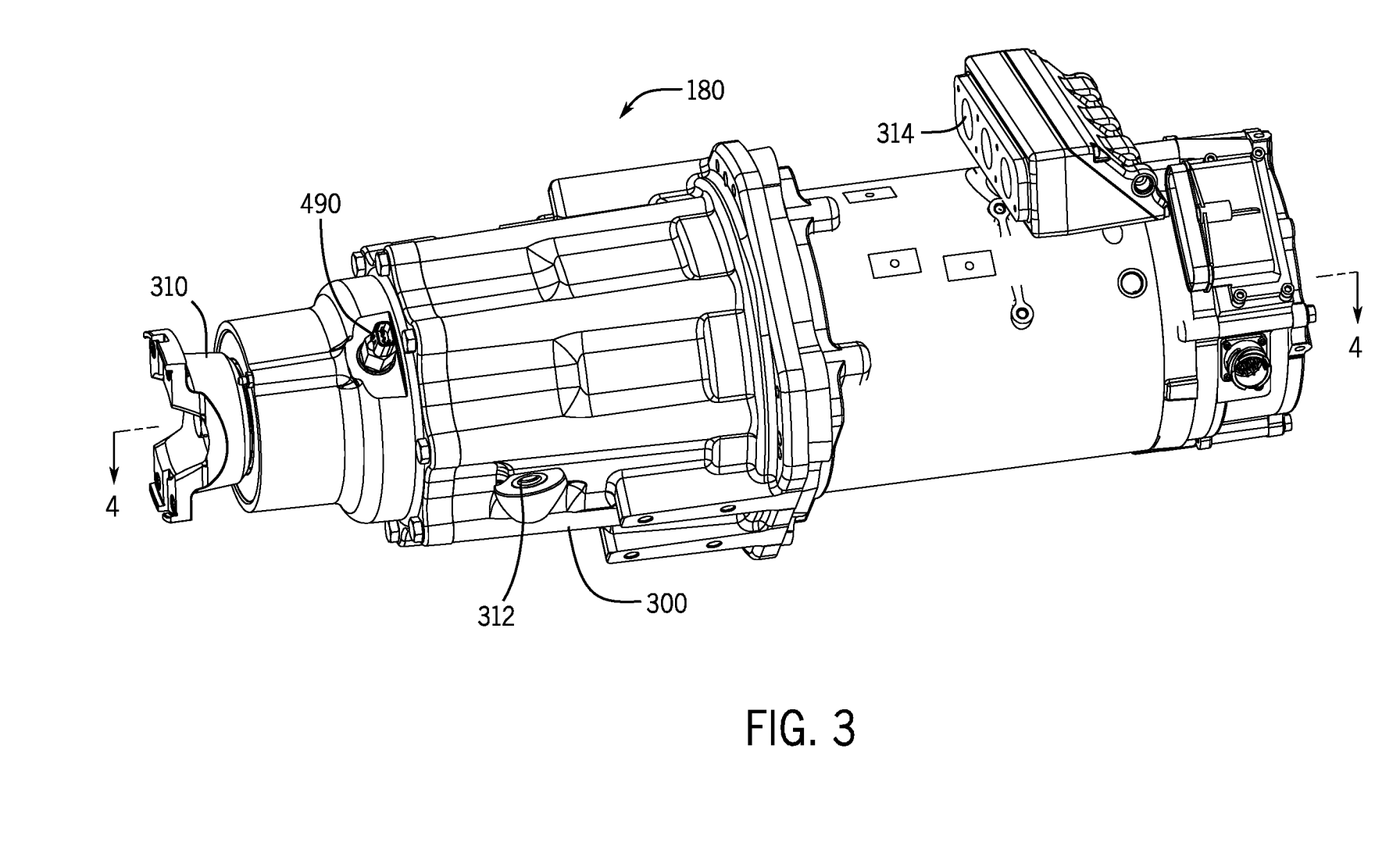
FIG. 3 is an auxiliary power unit of the implement drive system shown in FIG. 2 in accordance with an example embodiment.

FIG. 3 is a perspective view of the auxiliary power unit 180. As shown, the auxiliary power unit 180 may include a housing 300 that encloses and protects the components of the auxiliary power unit 180. As also shown in FIG. 3, the auxiliary power unit 180 includes a drive output or connector interface 310 that is configured to be coupled to axle coupling element 182 (FIG. 2) to provide rotational output. Additionally, the auxiliary power unit 180 may include one or more additional interfaces, such as a fluid interface 312 for receiving fluid power in the form of pressurized air or liquid and an electric interface 314 for receiving electric power.

Figure 4A:
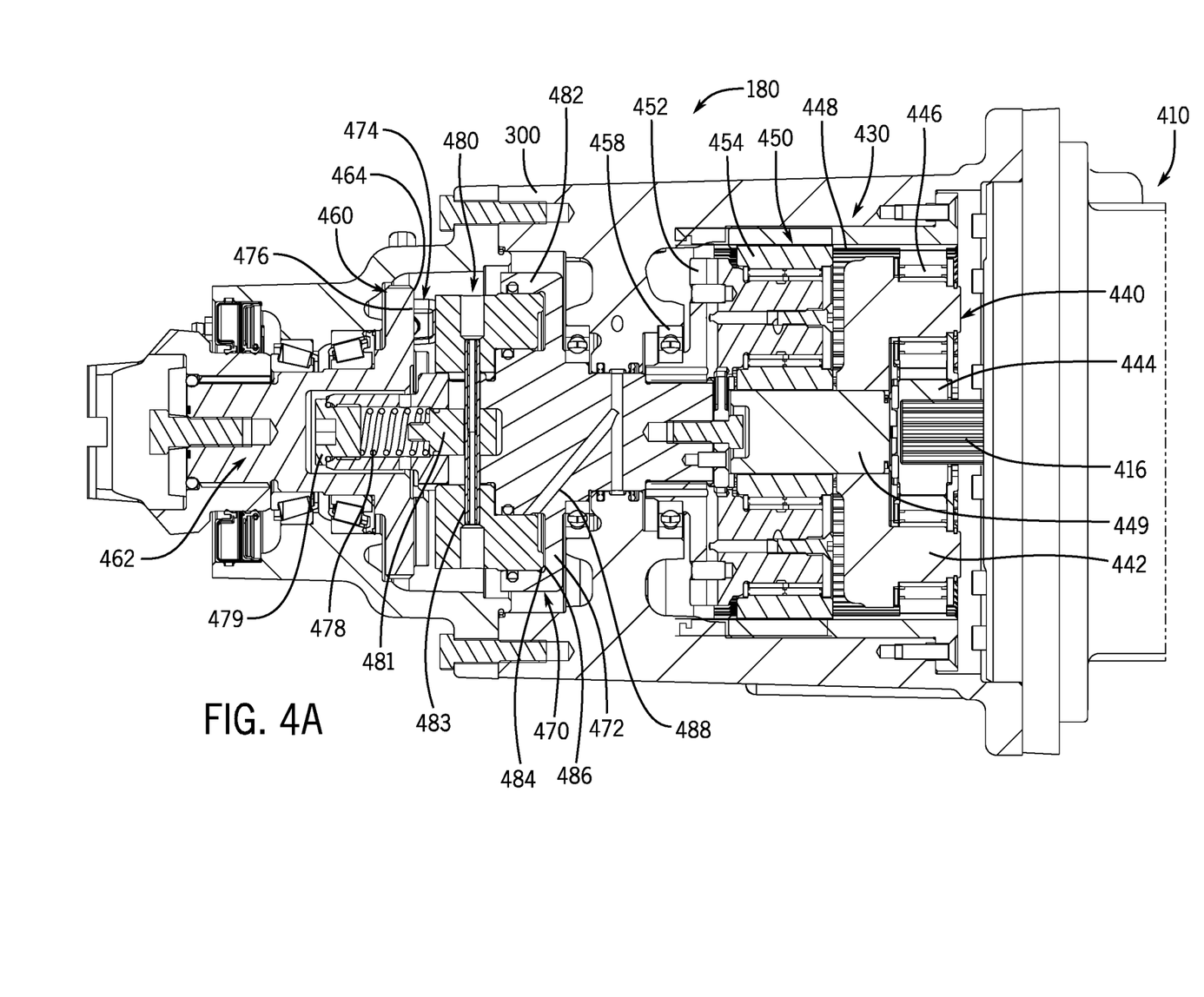
FIG. 4A is a cross-sectional view of the auxiliary power unit shown in FIG. 3 in a first or disengaged position in accordance with an example embodiment.
Figure 4B:
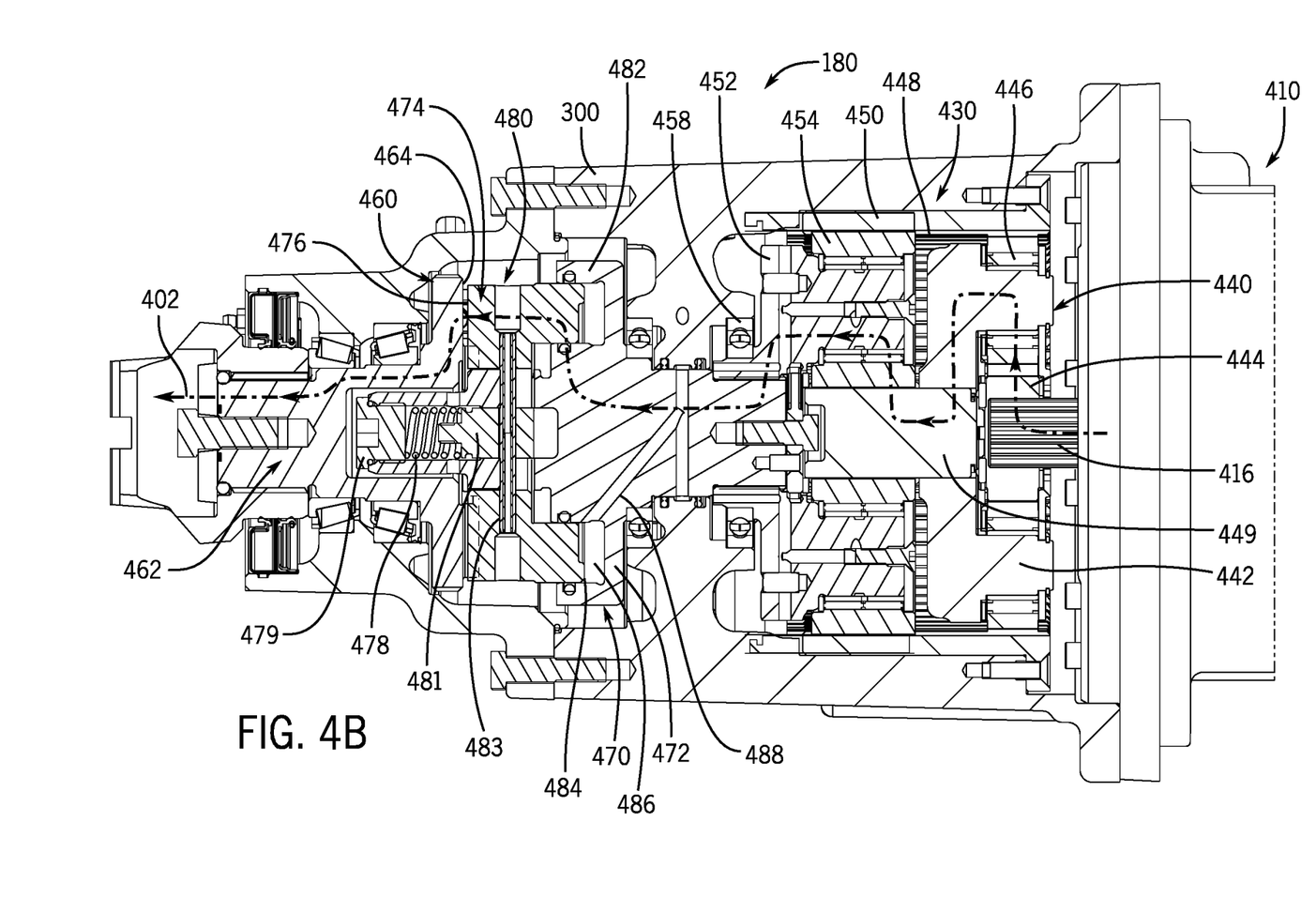
FIG. 4B is a cross-sectional view of the auxiliary power unit shown in FIG. 3 in a second or engaged position in accordance with an example embodiment.

FIGS. 4A and 4B are cross-sectional views of the auxiliary power unit 180 of FIG. 3 during a freewheel mode and a power mode, respectively. Generally, the auxiliary power unit 180 includes an electric motor 410, a gear train 430 to reduce speed and increase torque of the rotational input from the motor 410, and a disconnect device 460 that individually and/or collectively operate to generate power, to transfer power from the electric motor 410 to the drive output 310, and to selectively disconnect the drive output 310 from the gear train 430 and electric motor 410. As will be described in greater detail, the auxiliary power unit 180 operates in a freewheel mode in which the disconnect device 460 is disengaged, as shown in FIG. 4A, and a power mode in which the disconnect device 460 is engaged, as shown in FIG. 4B.

The electric motor 410 may be selectively activated and deactivated by the control unit 184, for example, automatically based on stored speed or load values or semi-automatically by a button selection from an operator within the cab of the work vehicle 110. Upon activation and application of electric current to the electric motor 410, the resulting interaction between magnetic fields of a rotor and stator assembly generates a force that turns the rotor. The rotor is mounted to a motor output shaft 416 that is rotationally coupled to the gear train 430. As noted above, electric power may be provided in the electric motor 410 via a battery (e.g., battery 124 of FIG. 1B) or a generator. The electric motor 410 may be activated in the power mode and deactivated in the freewheel mode.

The gear train 430 generally operates to reduce the rotational speed and increase the torque from the electric motor 410 to the disconnect device 460. The electric motor 410 operates at a relatively high speed and low torque, while the axle assembly 176 coupled to the output of the disconnect device 460 operates at a relatively low speed and high torque. As such, the gear train 430 functions to change the speed and torque from the electric motor 410 to a more appropriate speed and torque for the axle assembly 176.

In the example shown, the gear train 430 is a double planetary gear set, which includes a first planetary gear set 440 with a planet carrier 442, a sun gear 444, a set of planet gears 446, and a ring gear 448. Generally, the set of planet gears 446 includes a number of planet gears with teeth that engage corresponding teeth on an outer circumference of the sun gear 444 and corresponding teeth on an inner circumference of the ring gear 448. The planet gears 446 are supported by pinions of the planet carrier 442. The sun gear 444 is splined or otherwise mounted to the motor output shaft 416 for co-rotation therewith. The ring gear 448 is fixed to the housing 300 such that the planet gears 446 and the planet carrier 442 rotate within the ring gear 448 about the sun gear 444. The planet carrier 442 is additionally coupled to a second sun gear 449 of the second planetary set 450 that rotates with the first planet carrier 442. The second planetary set also includes a second planet carrier 452 with a second group of planet gears 454, the teeth of which engage teeth at the second sun gear 449 and ring gear 448. Note that in the described example, a common ring gear is disclosed for both planetary sets 440, 450, however, separate ring gears could be provided for each set. The secondary carrier 450 is supported by bearings 458 within the housing 300 and is splined or otherwise connected to portions of the disconnect device 460, as described below. As shown by the dot-dash line in FIG. 4B, the power flows from the output shaft 416 of the electric motor 410 through the first sun gear 444 to the first planet gears 446 and the first planet carrier 442. From there, power flows to the second sun gear 449, which is mounted to the first planet carrier 442, to the second planet gears 454 and second planet carrier 452 and on to the upstream part of the disconnect device 460.

Figure 5:
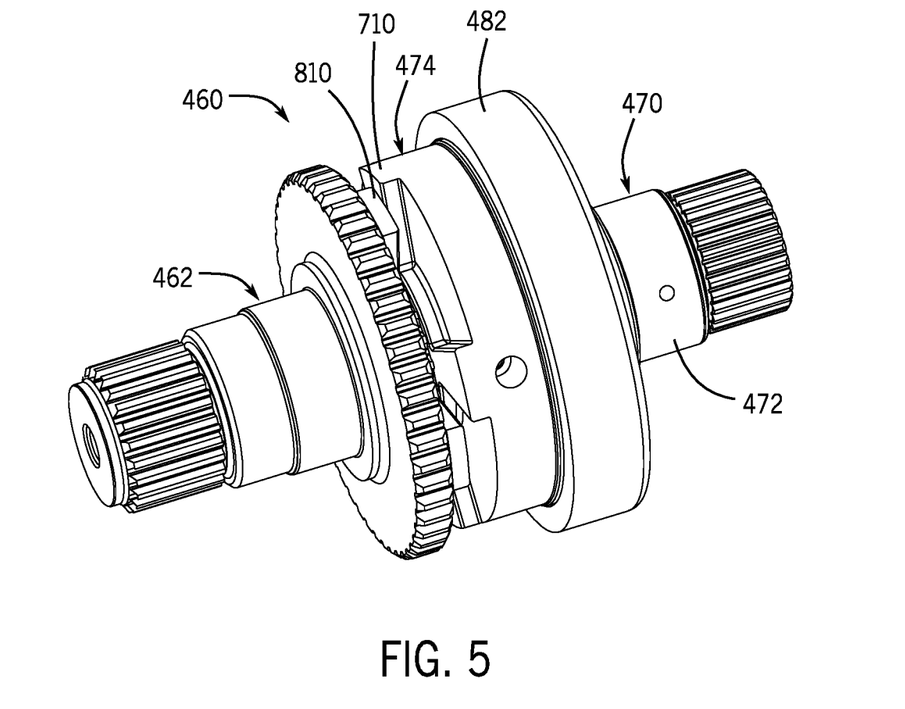
FIGS. 5-8 are various perspective views of a disconnect device that may be incorporated into the auxiliary power unit shown in FIGS. 4A and 4B in accordance with an example embodiment.
Figure 6:
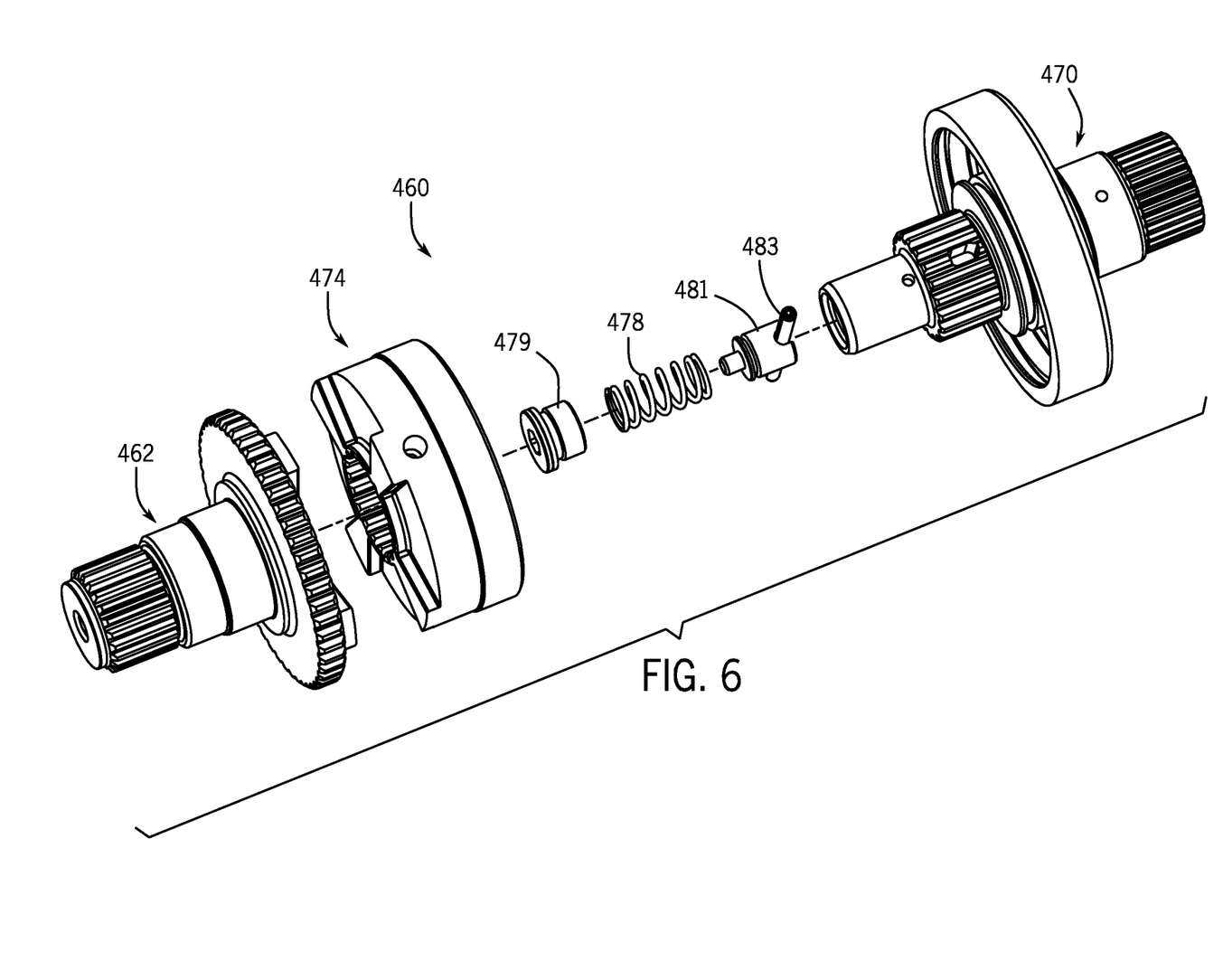

The disconnect device 460 is arranged within the housing 300 and includes selectively engageable and disengageable components, such as in the described embodiment, a first clutch component 462 and a second clutch component 470 that selectively engage and disengage for mutual and independent rotation, respectively. In this example, the disconnect device 460 is a dog or lock-jaw clutch with raised teeth or detents that interlock when engaged to facilitate torque transfer. Reference is briefly made to FIG. 5-8, which are perspective views of the disconnect device 460. For example, FIG. 5 depicts the first clutch component 462 engaging the second clutch component 470. It should be noted that the inter-engaging features of the example disconnect device 460 allow rotational force transfer between the clutch components with relatively low axial force being applied to the disconnect device 460. This allows the disconnect device 460 to be actuated by either hydraulic pressure or pneumatic pressure. Pneumatic pressure may be insufficient for use with other disconnect devices, such as friction packs and the like, which require a higher axially applied force to fully engage and transfer rotation between the mating elements of the disconnect device. It is noted, however, that the disconnect device could be a friction pack with hydraulic actuation.

In the described example, the second clutch component 470 is coupled (e.g., splined) to the secondary carrier 450 for rotation with the secondary carrier 450. The first clutch component 462 includes a first engagement interface or disk 464, which in this example, includes one or more teeth that extend from the surface of the first engagement interface 464. The second clutch component 470 includes a clutch hub 472 and a clutch piston 474. The clutch piston 474 is mounted on the clutch hub 472 for rotation therewith. The clutch piston 474 has a second engagement interface 476 facing the first engagement interface 464 of the first clutch component 462. The clutch piston 474 is configured to be actuated in an axial direction (e.g., left and right in FIG. 4A) such that the second engagement interface 476 selectively engages and disengages the first engagement interface 464.

Figure 7:
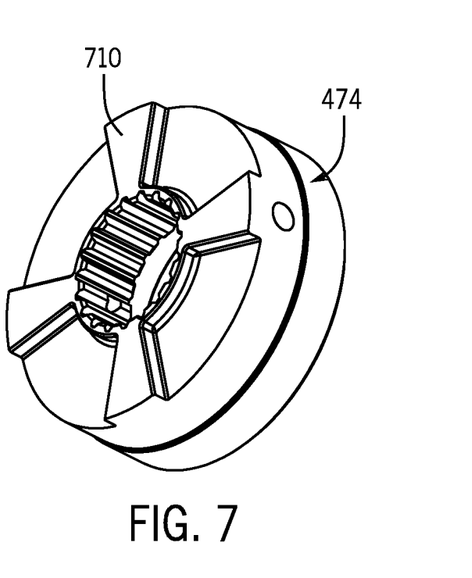
Figure 8:
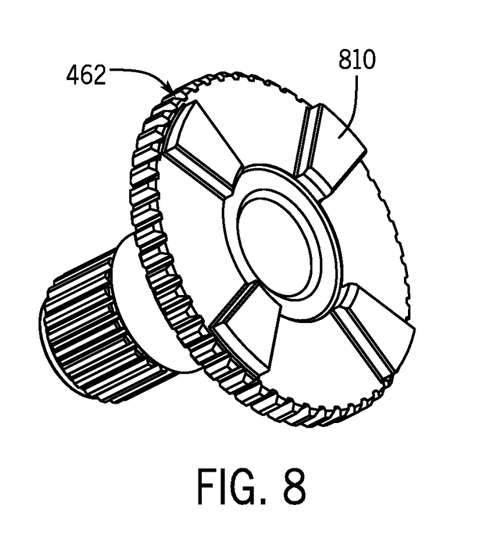

In one example, the clutch piston 474 is mounted on the clutch hub 472 for axial movement. A spring 478, housed within the clutch hub 472 by a retainer 479, is coupled to the clutch piston 474 via a piston element 481 and pipe 483 arrangement, which is configured to move axially in translation relative to the second clutch component 470, being limited by engagement of the pipe 483 ends of a slot 485 within the clutch hub 472. The spring 478 functions to bias the clutch piston 474 away from the first engagement interface 464 such that the second clutch component 470 is disengaged from the first clutch component 462. The disengaged position of FIG. 4A results in the freewheel mode in which the auxiliary power unit 180 does not drive the implement axle assembly 176. In FIGS. 7 and 8, the clutch piston 474 and the first clutch component 462 are respectively shown in isolation. Raised teeth 710 on the clutch piston 474 and the cooperating teeth 810 on the first clutch component 462 are most clearly depicted in FIGS. 7 and 8.

An actuation arrangement 480 is provided to oppose the force of the spring 478 such that the clutch hub 472 is axially moved such that the first and second engagement interfaces 464, 476 of the clutch components 462, 470 engage one another, as is shown in FIG. 4B and discussed in greater detail below. As noted above, the actuation arrangement 480 operates based on signals from the control unit 184 and is configured to actuate the disconnect device 460 for engagement in the power mode such that the torque from the electric motor 410 may be transferred to the axle assembly 176.

The actuation arrangement 480 may take various forms, as noted above. In the example of FIGS. 4A and 4B, the actuation arrangement 480 is a pneumatic system that utilizes pressurized air to reposition the clutch piston 474. As noted above, the pressurized air may be provided to the auxiliary power unit 180 from the fluid power source 126 via the fluid power line 188 (FIG. 1) based on signals from the auxiliary power unit control unit 184 and/or vehicle controller 150.

In the depicted example, the clutch hub 472 includes a flange 482 that at least partially surrounds a rear face 484 (relative to the second engagement interface 476) and outer circumference of the clutch piston 474 to form a cavity 486. A port 488 enables the introduction of pressurized air into the cavity 486 such that a force is exerted on the rear face 484 of the clutch piston 474. When the pneumatic force overcomes the spring force, the clutch piston 474 is shifted (to the left in FIG. 4A) such that the second engagement interface 476 engages the first engagement interface 464, as shown in FIG. 4B.

As noted above, the actuation arrangement 480 may be pneumatic (e.g., actuated based on pressurized air) or hydraulic (e.g., actuated with pressurized fluid, such as oil). In the example of FIGS. 4A and 4B, the actuation arrangement 480 is pneumatic such that pressurized air is introduced into cavity 486 through port 488 to place the disconnect device 460 into the engaged position for the power mode, as shown in FIG. 4B. To return to the disengaged position for the freewheel mode, the pneumatic pressure in cavity 486 may be released through port 488, thereby allowing the spring 478 to return the clutch piston 474 back into the disengaged position, as shown in FIG. 1. In the freewheel mode, the electric motor 410 may be deactivated and the electric motor 410 and gear train 430 are stationary due to the disconnection with the rotating components at the disconnect device 460.

Reference is also made to FIG. 4B, which is the cross-sectional view of FIG. 4A with the disconnect device 460 shifted into the engaged position. As noted above, in this position, the auxiliary power unit 180 is rotationally coupled to the implement axle assembly 176 such that the auxiliary power unit 180 may drive the implement 170. Accordingly, the disconnect device 460 enables the transfer of rotational force from the electric motor 410 and gear train 430 to the drive output 310. The schematic force path represented by line 402 is depicted in FIG. 4B.

In other examples that utilize fluid pressure, an actuation arrangement may operate in a similar manner. Using the pneumatic example of FIG. 4A as a reference, fluid may be introduced through port 488 and into cavity 486. A blocking device (e.g., a ball or valve) may be arranged within the clutch piston 474 to prevent air leakage, thereby enabling a pressure force sufficient to move the clutch piston 474. Instead of blocking device, the clutch piston 474 may have a similarly arranged check valve that enables the fluid pressure to rise until sufficient to overcome the spring force and reposition the clutch piston 474. To release the pressure and return to the disengaged position, the blocking device or check valve may shift and allow the fluid to flow through the clutch piston 474 and out of the disconnect device 460 through an outlet port. Other actuation arrangements may be provided.

In various examples, the auxiliary power unit 180 may also be provided with fluid cooling. For example, one or more coolant inlets may enable coolant flow through the housing 300. The housing 300 may also define one or more chambers surrounding one or more of the system components such that coolant within the chamber may remove heat. A coolant outlet may be provided to enable coolant to flow out of the chamber and out of the auxiliary power unit 180.

As noted above, the control unit 184 and/or controller 150 (FIG. 1B) may provide control signals associated with the electric power, fluid power, and/or the disconnect device 460 based on the selected mode. The control unit 184 and/or controller 150 may also provide command signals for activating, deactivating, and modulating the electric motor 410. In one example, the control unit 184 may receive and evaluate signals from one or more sensors. In the depicted example, sensors 490 (one shown in FIG. 3) are arranged relative to the first clutch component 462 to measure the rotational speed of the rotating first clutch component 462 (which is representative of the implement wheel speed). Based on this information, the control unit 184 may command and modulate the electric motor 410 to match the speed such that the disconnect device 460 may safely engage and subsequently drive the axle assembly 176.

Figures 9, 10:
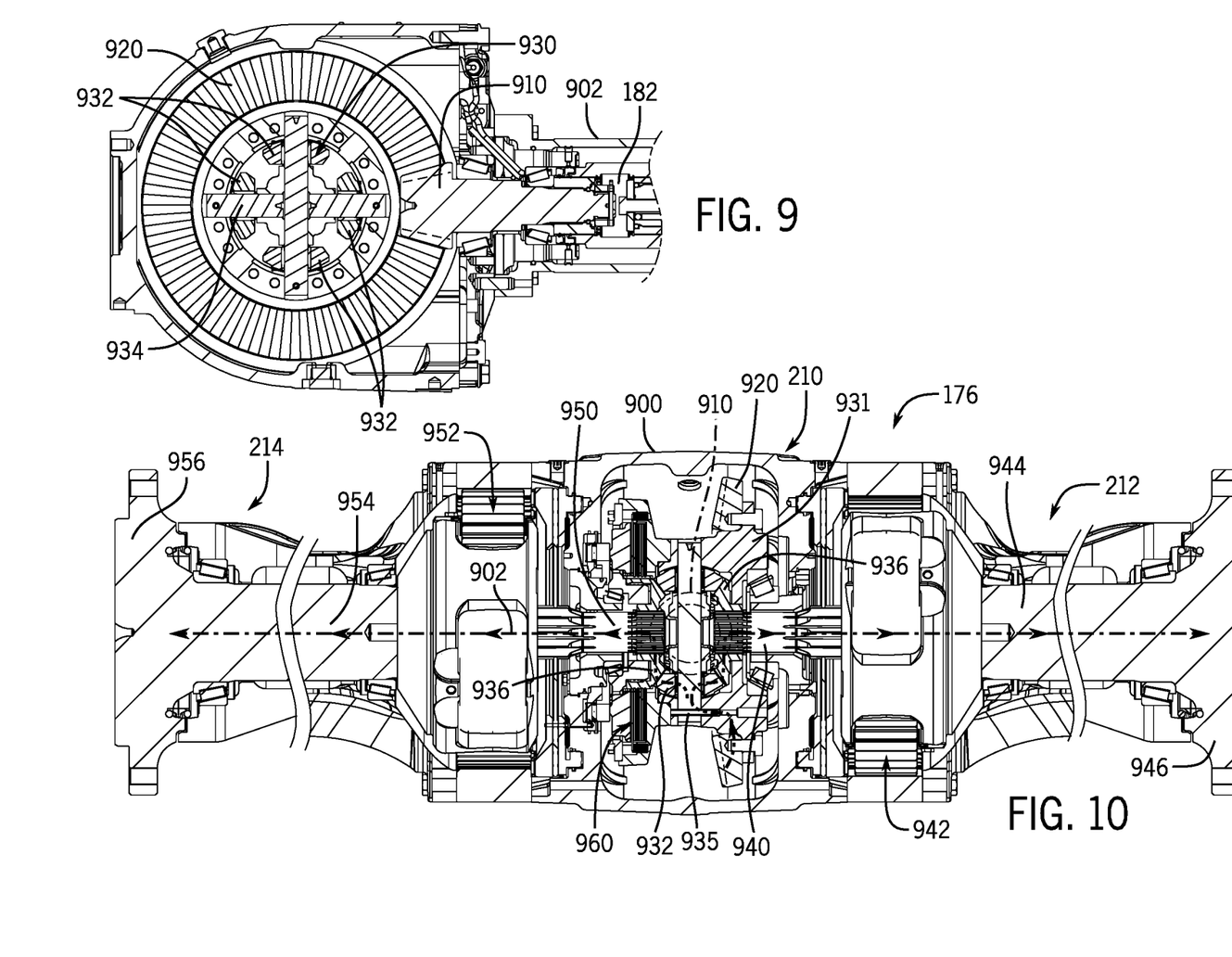
FIGS. 9 and 10 are cross-sectional views taken along planes 9-9 and 10-10 in FIG. 2 of an axle assembly that may be incorporated into an implement drive system in accordance with an example embodiment.

FIGS. 9 and 10 are sectional views of the axle assembly 176 that may be incorporated into the implement drive system 200 in accordance with an example embodiment. FIGS. 9 and 10 are orthogonal views of one another and particularly depict the differential 210 in greater detail.

As shown, the axle assembly 176 is housed within a housing 900. The axle assembly 176 has an interface 902 that receives the axle coupling element 182 from the auxiliary power unit 180 (FIGS. 3, 4A and 4B). The axle coupling element 182 in the interface 902 is rotationally coupled to an input bevel gear drive 910. The input bevel gear drive 910 has teeth that engage corresponding teeth of a cooperating bevel gear drive 920 oriented orthogonally to the input bevel gear drive 910. The bevel gear drive 920 is an annular tapered ring gear that is further coupled to a spider gear assembly 930 that is mounted within an inner housing 931 to which the bevel gear drive 920 is mounted. The spider gear assembly 930 includes a series of spider gears 932 supported by tubes or rods 934 and that engage bevel gears 936 splined or otherwise mounted at the ends of stub shaft drive inputs 940, 950. The stub shaft drive inputs 940, 950 are respectively coupled to axle shafts 944, 954 via a gear train 942, 952, such as reduction planetary gear sets. Wheel mounts 946, 956 are arranged on each end of the axle shafts 944, 954.

In this manner, the differential 210 enables the wheels mounted on each wheel mount 946, 956 to rotate at different speeds, e.g., for example in a turn, by balancing the increase in speed of one wheel with a decrease in speed by the other. In this example, as indicated by the dot-dash line in FIG. 10, within the axle assembly the power flows from the input bevel gear drive 910 to the bevel gear drive 920, through the inner housing 931 to the tubes 934 (via pin connections 935) and the spider gears 932 to the bevel gears 936, and via the stub shaft drive inputs 940, 950 to the rest of the gear train 942, 952 and axle shafts 944, 954 to the wheel mounts 946, 956. Under normal travel conditions in which both left- and right-side wheels experience equal or near-equal loading, the spider gear assembly 930, the inner housing 931 and the bevel gear drive 920 all rotate about the lateral long axis of the axle assembly, and there is no relative rotation of the spider gears 932 about the axis of the tubes 934 to which they are mounted. When different loading is realized on the wheels (such as during a turn), however, the spider gears 932 will turn about the long axes of the tubes 934 as they rotate about the long axis of the axle assembly. The direction of rotation of the spider gears 932 and the rotation of the tubes 934 will effect an additive increase in speed of the lower loaded wheel relative to the higher loaded wheel. For example, the wheel at the outside of a turn will be allowed to rotate a higher speed relative to the inside wheel. In the example embodiment, the differential 210 also includes a differential lock 960 formed by friction disks that, when actuated, engage one another to prevent the spider gear assembly 930 from driving the stub shaft drive inputs 940, 950 at different rates. Other differential arrangements may be provided.

Figure 11:
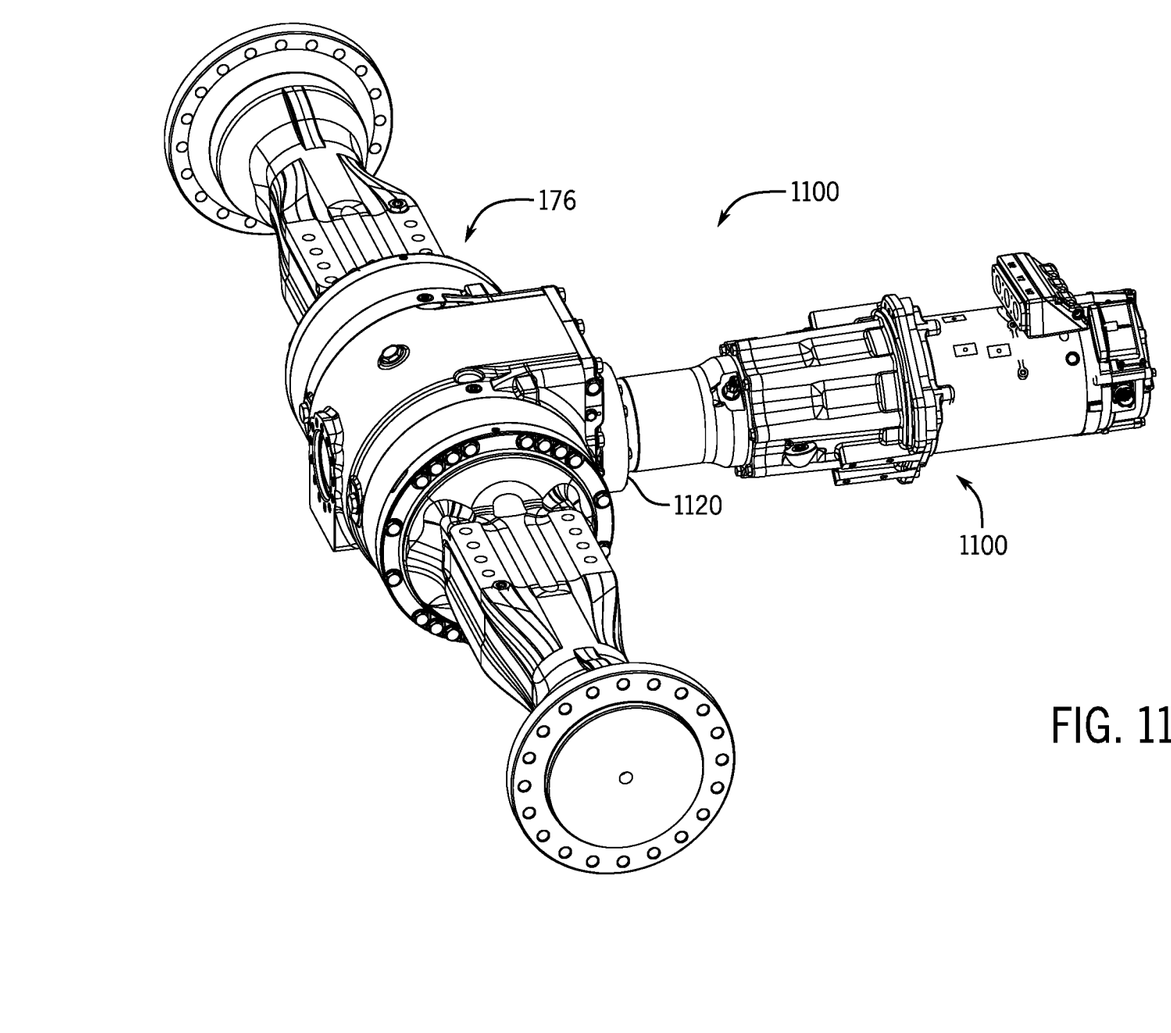
FIG. 11 is a view of an implement drive system in accordance with another example embodiment.

FIG. 11 is a view of an implement drive system 1100 in accordance with another example embodiment. Generally, and unless otherwise noted or depicted, the implement drive system 1100 is similar to the implement drive system 200 discussed above. In this example, an auxiliary power unit 1110 may be more directly incorporated into the axle assembly 176 of the implement in a trans-axle arrangement. For example, an axle connector (i.e., drive shaft) may be omitted and a coupler housing 1120 may be included to physically mount the auxiliary power unit 1110 directly to the axle assembly housing.

Accordingly, various embodiments of the disclosure provide an implement drive system with an auxiliary power unit suitable for driving into an axle assembly. Embodiments facilitate the installation of an auxiliary power unit with an electric motor onto an implement, such as a grain cart, manure spreader, or similar trailed vehicle typically attached to a prime mover. The implement is thus enabled to provide tractive assistance in high-load applications and/or difficult travel conditions, such as in mud, loose soil, or hillsides rather than relying solely on the tractive effort of the prime mover (tractor, truck, etc.). The electric motor may be supplied power by a generator or battery system on the prime mover. Such implement drive systems provide for a disconnect device to positively engage and disengage the electric motor from the axle assembly during high speed operation, such as roading, where tractive assistance is not required and would otherwise be inefficient. The disconnect mechanism may be a jaw or dog clutch that is actuated by air or fluid pressure and disconnected by a spring. The disconnect feature may prevent an over-speed operation of the upstream motor and gear train during high speed operation and eliminate the need for multiple speed transmission on the axle. Engagement and disengagement of the disconnect device may be assisted by modulation of the electric motor RPM to match the speed of the implement. The auxiliary power unit may be integrated into an axle directly (e.g., as a transaxle arrangement) or connected by an intervening driveshaft connector. In particular, the auxiliary power unit may provide a compact arrangement for providing power to implement axles in which a single package houses an electric motor, gear train, and disconnect device. In addition to the agricultural equipment described herein, embodiments may be incorporated into other types of applications, such as mining, forestry, or construction.

Also, the following examples are provided, which are numbered for easier reference.

1. An implement drive system for an implement configured to be towed by a prime mover vehicle in a work vehicle train, the system including: an axle arrangement configured to support wheels of the implement; and an auxiliary power unit including: an electric motor; a planetary gear set receiving rotational input from the electric motor and providing a rotational output with a decreased rotational speed and an increased torque relative to the rotational input from the electric motor; and a disconnect device having an output configured to be coupled to the axle arrangement; wherein the disconnect device is movable to a first position in which the disconnect device transfers the rotational output from the planetary gear set to the axle arrangement such the rotational input from the electric motor drives the wheels of the implement; and wherein the disconnect device is movable to a second position in which the disconnect device decouples the axle arrangement from the rotational input of the electric motor.

2. The implement drive system of example 1, wherein the disconnect device includes: a first clutch component rotationally fixed to the output; a second clutch component rotationally fixed to the planetary gear set; and an actuation arrangement configured to selectively provide a source of fluid pressure onto the second clutch component to move the second clutch component from the second position to the first position.

3. The implement drive system of example 2, wherein the first clutch component has a first engagement interface, and wherein the second clutch component has a second engagement interface facing the first engagement interface and a rear face opposite the second engagement interface, the rear face at least partially forming a cavity that receives the fluid pressure to urge the second clutch component towards the first clutch component such that the second engagement interface engages the first engagement interface in the first position.

4. The implement drive system of example 3, wherein the first engagement interface and the second engagement interface form a jaw clutch arrangement.

5. The implement drive system of example 3, wherein the actuation arrangement includes a spring to bias the second clutch component into the second position upon release of the fluid pressure.

6. The implement drive system of example 3, further including a control unit electrically coupled to the electric motor and configured to provide commands for operating the electric motor.

7. The implement drive system of example 6, wherein the control unit is further configured to control the fluid pressure applied to the second clutch component.

8. The implement drive system of example 7, wherein the control unit is configured to control the fluid pressure to selectively reposition the second clutch component based on a speed of the prime mover vehicle.

9. The implement drive system of example 7, further including a sensor electrically coupled to the control unit and positioned to measure a rotational speed of the second clutch component, wherein the control unit is configured to receive the rotational speed of the first clutch component and to provide the commands for operating the electric motor such that a rotational speed of the second clutch component matches the rotational speed of the first clutch component during a movement of the disconnect device from the second position to the first position.

10. The implement drive system of example 1, further including an axle coupling element extending between the output of the disconnect device and the axle arrangement, the axle coupling element configured to transfer the rotational input from the electric motor to the axle arrangement when the disconnect device is in the first position.

11. The implement drive system of example 1, wherein the output of the disconnect device is directly coupled to the axle arrangement.

12. A work vehicle train, including: a prime mover vehicle including: a propulsion drive assembly configured to provide propulsion for the prime mover vehicle; and a power system including a battery configured to provide electric power and a fluid power source configured to provide fluid power; and an implement configured to be towed by the prime mover vehicle and including: a chassis coupled to the prime mover vehicle; an axle assembly coupled to the chassis and configured to support wheels of the implement; and an auxiliary power unit including: an electric motor configured to receive the electric power from the battery; a planetary gear set receiving rotational input form the electric motor and providing a rotational output with a decreased rotational speed and an increased torque relative to the rotational input from the electric motor; and a disconnect device having an output configured to be coupled to the axle arrangement and coupled to selectively receive the fluid power from the power system; wherein the disconnect device is movable, upon receiving the fluid power, to a first position in which the disconnect device transfers the rotational output from the planetary gear set to the axle arrangement such that the rotational input from the electric motor drives the wheels of the implement; and wherein the disconnect device is movable to a second position in which the disconnect device decouples the axle arrangement from the rotational input of the electric motor.

13. The work vehicle train of example 12, wherein the fluid power source is a pneumatic power source configured to provide the fluid power in the form of pneumatic power to the disconnect device for moving the disconnect device from the second position to the first position.

14. The work vehicle train of example 12, wherein the disconnect device includes: a first clutch component rotationally fixed to the output; a second clutch component rotationally fixed to the planetary gear set; and an actuation arrangement configured to selectively direct the fluid power from the fluid power source as fluid pressure onto the second clutch component to move the second clutch component from the second position to the first position.

15. The work vehicle train of example 14, wherein the first clutch component has a first engagement interface, and wherein the second clutch component has a second engagement interface facing the first engagement interface and a rear face opposite the second engagement interface, the rear face at least partially forming a cavity that receives the fluid pressure to urge the second clutch component towards the first clutch component such that the second engagement interface engages the first engagement interface in the first position.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. An implement drive system for an implement configured to be towed by a prime mover vehicle in a work vehicle train, the system comprising:
    an axle arrangement configured to support wheels of the implement; and
    an auxiliary power unit comprising:
        an electric motor;
        a planetary gear set receiving rotational input from the electric motor and providing a rotational output with a decreased rotational speed and an increased torque relative to the rotational input from the electric motor; and
        a disconnect device having an output configured to be coupled to the axle arrangement;
        wherein the disconnect device is movable to a first position in which the disconnect device transfers the rotational output from the planetary gear set to the axle arrangement such that the rotational input from the electric motor drives the wheels of the implement; and
        wherein the disconnect device is movable to a second position in which the disconnect device decouples the axle arrangement from the rotational input of the electric motor.

2. The implement drive system of claim 1, wherein the disconnect device comprises:
    a first clutch component rotationally fixed to the output;
    a second clutch component rotationally fixed to the planetary gear set; and
    an actuation arrangement configured to selectively provide a source of fluid pressure onto the second clutch component to move the second clutch component from the second position to the first position.

3. The implement drive system of claim 2,
    wherein the first clutch component has a first engagement interface, and
    wherein the second clutch component has a second engagement interface facing the first engagement interface and a rear face opposite the second engagement interface, the rear face at least partially forming a cavity that receives the fluid pressure to urge the second clutch component towards the first clutch component such that the second engagement interface engages the first engagement interface in the first position.

4. The implement drive system of claim 3, wherein the first engagement interface and the second engagement interface form a jaw clutch arrangement.

5. The implement drive system of claim 3, wherein the actuation arrangement includes a spring to bias the second clutch component into the second position upon release of the fluid pressure.

6. The implement drive system of claim 3, further comprising a control unit electrically coupled to the electric motor and configured to provide commands for operating the electric motor.

7. The implement drive system of claim 6, wherein the control unit is further configured to control the fluid pressure applied to the second clutch component.

8. The implement drive system of claim 7, wherein the control unit is configured to control the fluid pressure to selectively reposition the second clutch component based on a speed of the prime mover vehicle.

9. The implement drive system of claim 7, further comprising a sensor electrically coupled to the control unit and positioned to measure a rotational speed of the second clutch component, wherein the control unit is configured to receive a rotational speed of the first clutch component and to provide the commands for operating the electric motor such that the rotational speed of the second clutch component matches the rotational speed of the first clutch component during a movement of the disconnect device from the second position to the first position.

10. The implement drive system of claim 1, further comprising an axle coupling element extending between the output of the disconnect device and the axle arrangement, the axle coupling element configured to transfer the rotational input from the electric motor to the axle arrangement when the disconnect device is in the first position.

11. The implement drive system of claim 1, wherein the output of the disconnect device is directly coupled to the axle arrangement.

12. A work vehicle train, comprising:
a prime mover vehicle comprising:
- a propulsion drive assembly configured to provide propulsion for the prime mover vehicle; and
- a power system including a battery configured to provide electric power and a fluid power source configured to provide fluid power; and an implement configured to be towed by the prime mover vehicle and comprising:
- a chassis coupled to the prime mover vehicle;
- an axle arrangement coupled to the chassis and configured to support wheels of the implement; and
- an auxiliary power unit comprising:
  - an electric motor configured to receive the electric power from the battery;
  - a planetary gear set receiving rotational input form the electric motor and providing a rotational output with a decreased rotational speed and an increased torque relative to the rotational input from the electric motor; and
  - a disconnect device having an output configured to be coupled to the axle arrangement and coupled to selectively receive the fluid power from the power system;
  - wherein the disconnect device is movable, upon receiving the fluid power, to a first position in which the disconnect device transfers the rotational output from the planetary gear set to the axle arrangement such that the rotational input from the electric motor drives the wheels of the implement; and
  - wherein the disconnect device is movable to a second position in which the disconnect device decouples the axle arrangement from the rotational input of the electric motor.

13. The work vehicle train of claim 12, wherein the fluid power source is a pneumatic power source configured to provide the fluid power in the form of pneumatic power to the disconnect device for moving the disconnect device from the second position to the first position.

14. The work vehicle train of claim 12, wherein the disconnect device comprises:
- a first clutch component rotationally fixed to the output;
- a second clutch component rotationally fixed to the planetary gear set; and
- an actuation arrangement configured to selectively direct the fluid power from the fluid power source as fluid pressure onto the second clutch component to move the second clutch component from the second position to the first position.

15. The work vehicle train of claim 14,
wherein the first clutch component has a first engagement interface, and
wherein the second clutch component has a second engagement interface facing the first engagement interface and a rear face opposite the second engagement interface, the rear face at least partially forming a cavity that receives the fluid pressure to urge the second clutch component towards the first clutch component such that the second engagement interface engages the first engagement interface in the first position.

16. The work vehicle train of claim 15, wherein the first engagement interface and the second engagement interface form a jaw clutch arrangement.

17. The work vehicle train of claim 14, wherein the actuation arrangement includes a spring to bias the second clutch component into the second position upon release of the fluid pressure.

18. The work vehicle train of claim 14, further comprising a sensor electrically coupled to a control unit and positioned to measure a rotational speed of the second clutch component, wherein the control unit is configured to receive a rotational speed of the first clutch component and to provide the commands for operating the electric motor such that the rotational speed of the second clutch component matches the rotational speed of the first clutch component during a movement of the disconnect device from the second position to the first position.

19. The work vehicle train of claim 12, further comprising
a control unit electrically coupled to the electric motor and configured to provide commands for operating the electric motor and for operating the disconnect device; and
an operator interface arranged on the prime mover vehicle and coupled to the control unit, the operator interface configured to receive an input from an operator for moving the disconnect device into the first position or the second position, the control unit configured to receive and implement the input from the operator interface to move the disconnect device.

20. The work vehicle train of claim 12, further comprising a control unit electrically coupled to the electric motor and configured to provide commands for operating the electric motor and for operating the disconnect device, the control unit configured to move the disconnect device into the first position or the second position based on a speed of the prime mover vehicle.

* * * * *